United States Patent [19]
Aymerich et al.

[11] Patent Number: 5,660,424
[45] Date of Patent: Aug. 26, 1997

[54] SUNVISOR WITH IMPACT-BREAKABLE SUPPORT

[75] Inventors: José Aymerich; Jesús Prat, both of Rubi, Spain

[73] Assignee: Fico I.T.M., S.A., Barcelona, Spain

[21] Appl. No.: 491,883

[22] PCT Filed: Nov. 18, 1994

[86] PCT No.: PCT/ES94/00120

§ 371 Date: Jun. 23, 1995

§ 102(e) Date: Jun. 23, 1995

[87] PCT Pub. No.: WO95/14585

PCT Pub. Date: Jun. 1, 1995

[30] Foreign Application Priority Data

Nov. 25, 1993 [ES] Spain ................... 9302476

[51] Int. Cl.$^6$ .................................................. B60J 3/00
[52] U.S. Cl. .................................................. 296/97.12
[58] Field of Search .................. 296/97.1, 97.9, 296/97.12, 97.13

[56] References Cited

U.S. PATENT DOCUMENTS

| 4,176,875 | 12/1979 | Dow | 296/97.13 |
| 4,390,202 | 6/1983 | Flowerday et al. | 296/97.13 |
| 4,858,983 | 8/1989 | White et al. | 296/97.13 |

*Primary Examiner*—Andrew C. Pike
*Attorney, Agent, or Firm*—Michael J. Striker

[57] ABSTRACT

A sunvisor comprises a body, an attachment device for pivotally attaching the body to an automobile structure, a support releasably engageable by the body, and weakening structure for facilitating disconnection of the body from the attachment device and for the support in the event of collision, the weakening structure including a first weakening groove provided in the region Of the attachment device, and a second weakening groove provided in the region of the support.

9 Claims, 1 Drawing Sheet

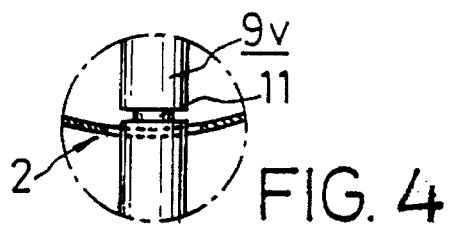
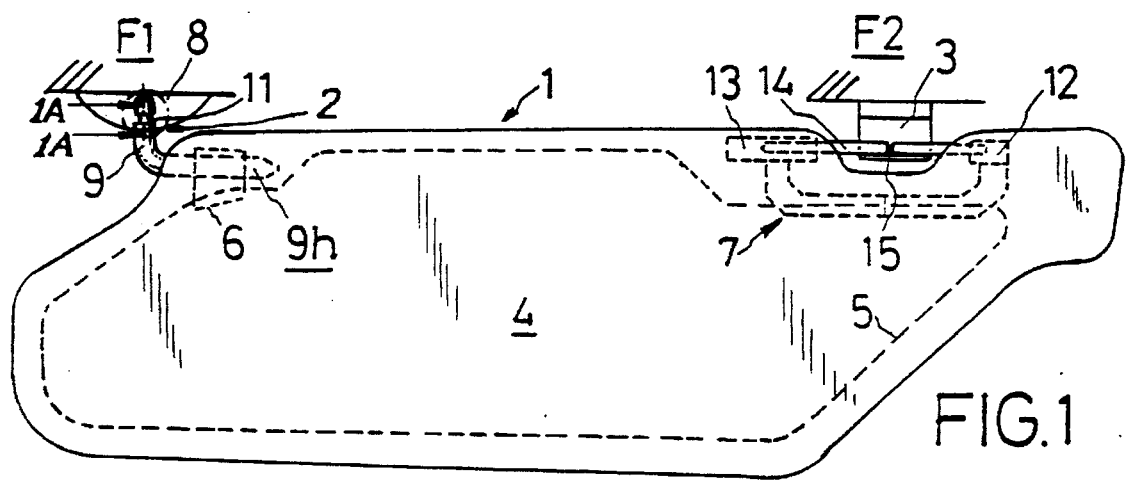
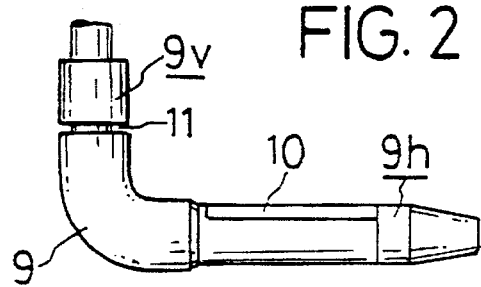
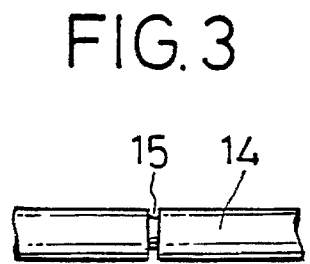

SUNVISOR WITH IMPACT-BREAKABLE SUPPORT

BACKGROUND OF THE INVENTION

The object of the present invention relates to an improved structure for sunvisors which is intended, specifically, to increase the safety of automobile occupants in the event of collision.

A wide variety of embodiments of sunvisors for automobiles are well known. They are generally based on a body obtained by injecting a material of low specific gravity, such as polyurethane, incorporating a frame for reinforcing the structure, consisting of a metal rod whose shape is similar to that of the outline of the sunvisor body, and which is firmly attached to a hinge and a hanging bridge. As is also well known, the sunvisor is attached by one of its ends to an attachment device generally comprising a base member and a bent supporting pivot, while its other end is attachable to a support fitted for the purpose. Both the device and the support are anchored on their respective fixed points on the structure of the automobile. The sunvisor is fitted to the attachment device by means of the supporting pivot and in such a way that the vertical arm of the supporting pivot remains housed in said base member and then horizontal arm of the supporting pivot remains housed in the sunvisor's hinge. This means of fitting enables the sunvisor to be turned around the base member of the attachment device and around the horizontal arm of the supporting pivot. Therefore the sunvisor can be moved by the user to any of its normal positions of ruse, remaining stable in any of those positions owing to the mutual action of the positioning means incorporated in both the supporting pivot of the attachment device and the sunvisor's hinge. The purpose of fitting the sunvisor to the support attached to the structure of the vehicle via the hanging bridge is to avid any mechanical overloads on the attachment device under normal conditions.

One of known attachment devices for sunvisors in automobiles is disclosed in Spanish patent application P 9201316. This device has a base member and a bent supporting pivot. Another attachment with the hanging bridge for sunvisors disclosed in Spanish patent application P 9101388. The hanging bridge has a sliding body and a retaining body inter-attachable and attachable to the metal rod, and a structurally independent pin which stands clear of the sunvisor and is attachable to the support attached to the structure of the vehicle.

When the sunvisor is fitted to the attachment device and to the support, by means of the hinge and the hanging bridge respectively, the sunvisor forms a whole with the structure of the automobile through the supporting pivot of the attachment device and through the pin of the sunvisor's hanging bridge. Under these circumstances, in the event of collision, if the vehicle's occupants, particularly-those traveling in front, are thrown against the sunvisor, the rigidity and high strength of the coupling of the sunvisor to the vehicle structure may, under certain circumstances, result in injury.

SUMMARY OF THE INVENTION

Accordingly, it is an object of the present invention to provide a sunvisor which has increasing safety of the occupants.

The new sunvisor of this invention has a body made by injection-molding a material such as polyurethane in which is incorporated a metal reinforcing rod, an attachment device and a support. Therein, the attachment device comprises a base member anchored to the structure of the vehicle and a bent support pivot, made in plastic materials. One of its arms—the vertical one—is attachable to the base member, and the other arm—the horizontal one—is attachable to the sunvisor. The sunvisor has a hinge that is suitably sized for receiving the horizontal arm of the supporting pivot of the attachment device. A hanging bridge incorporates a pin, also made in plastic materials, which stands clear of the sunvisor and is attachable to the support anchored to the vehicle's structure. The sunvisor may be turned around the base member of the attachment device and around the horizontal arm of the supporting pivot of this device, taking up, in a stable manner, through the action of the positioning devices said device and hinge possess, any position selected by the user from among those commonly used.

The new sunvisor structure of this invention is characterized in that the vertical arm of the supporting pivot of the attachment device and the pin of the hanging bridge each has a transverse weakening groove which significantly reduces their cross sections without interfering with their working under normal conditions of use. Preferably, the transverse weakening groove on the vertical arm of the supporting pivot of the attachment device is located, internally, at a relatively short distance from the external surface of the base member, and the transverse weakening groove on the pin of the hanging bridge is located in the part which stands clear of the sunvisor or the external part of the pin.

Another characteristic of the improved sunvisor structure of this invention is the fact the transverse weakening grooves of the supporting pivot and the pin go all around or partly around the perimeter of that pivot and that pin.

The features described from the improved sunvisor structure of this invention contribute a low-cost solution to the risk factor posed in general by the rigidity and strength of the attachment of known embodiments of sunvisor structures, such as those described, to the structure of the automobile. For indeed, in the event of collision, with the occupants of the vehicle being thrown against the improved sunvisor structure of this invention, only a small part of the impact energy would suffice to break both the supporting pivot of the attachment device and the pin of the hanging bridge at their points of least resistance, which are determined by the location of the weakening grooves. Consequently, the sunvisor detaches itself from its location owing to losing its link with the vehicle structure, thus ceasing to be rigid obstacle capable, under certain circumstances as previously described, causing injury to the occupants of the vehicle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of the improved sunvisor structure of this invention.

FIG. 2 is a partial side view of the supporting pivot of the sunvisor's attachment device.

FIG. 3 is a partial side view of the pin of the sunvisor's hanging bridge.

FIG. 4 is a view showing the encircled fragment 4 of FIG. 1.

DESCRIPTION OF PREFERRED EMBODIMENTS

The improved sunvisor structure of this invention, which has an example of embodiment is here described, comprises, as shown in FIG. 1, the sunvisor 1, the attachment device 2, and the support 3. All these items shown in FIG. 1 are given only as a nonrestrictive example, since they may take on other forms and layouts with respect to each other without this affecting the essence of the invention.

FIG. 1 shows how the sunvisor 1 comprises, basically, the body 4, which is injection-molded in a light material such as polyurethane, which incorporates the metal rod 5, shown schematically by dotted lines, which acts as a structural reinforcement for the body 4 in order to prevent deformations when the user handles the sunvisor 1. The metal rod 5 is closed in shape, being very similar to the shape of the body 4, and at its longitudinal ends are fitted the hinge 6 and the hanging bridge which, like the metal rod 5, have been schematically represented by dotted lines. It is worth pointing out here that the sunvisor 1 may incorporate any additional item such as, for example, the so-called vanity mirror, this likewise not affecting the essence of the invention.

FIG. 1 shows how the sunvisor 1 is linked to a fixed point F1 of the automobile's structure by means of the attachment device 2. The device comprises, basically, the base member 8, attached to said point F1, and the supporting pivot 9 which is shown in part and in greater detail in FIG. 2. The base member 8 and this supporting pivot 9 are made preferably in plastic materials. The supporting pivot 9 is bent in shape, with its vertical arm 9v being attached to the base member 8, and its horizontal arm 9h being attached to the hinge 6 of the sunvisor 1. These attachments enable the sunvisor 1 to be turned around the base member 8, by means of the axis of rotation defined by the vertical arm 9v, and around the horizontal arm 9h, in such a way that the user may set the sunvisor 1 to any of its normal positions for use. In addition, these attachments possess means of positioning, such as the positioning flat 10 on the horizontal arm 9h of the supporting pivot 9 shown in FIG. 2, which prevent, under normal conditions of use, the sunvisor 1 from departing in an uncontrolled fashion from the position set by the user. FIGS. 1 and 2 show how the vertical arm 9v of the supporting pivot 9 has its weakening groove 11, which, as shown in more detail in FIG. 1, is arranged internally at a relatively short distance from the outer surface of the base member 8.

FIG. 1 shows how the sunvisor 1 is also attached to the fixed point F2 of the automobile's structure by means of the support 3 which is attached to said point F2. The sunvisor 1 may be attached to the support 3 by means of the hanging bridge 7 which, in this embodiment of the improved sunvisor of this invention comprises, basically, the retaining body 12, the sliding body 13, and the pin 14, made preferably in plastic materials. FIG. 3 shows in greater detail how the central section of the pin 14, which is the section of the pin 14 that stands clear of the sunvisor 1, has its weakening groove 15 cut centrally.

Both weakening grooves 11 and 15, on the supporting pivot 9 and the pin 14 respectively, may be of any cross section, such as a U-section. They may affect wholly or in part the perimeter of said supporting pivot 9 and 14, depending on the determining factors present in each specific application, e.g., the size of the sunvisor 1 or the material in which the supporting pivot 9 or the pin 14 are made. In any event, the weakening grooves 11 and 15 are so sized as not to affect the operation of the sunvisor 1 under normal conditions of use.

Consequent upon the foregoing, in the event of a collision in which the occupants of the vehicle are thrown against the sunvisor 1, a small part of the impact energy will suffice to break both the supporting pivot 9 and the pin 14 at the point where the weakening grooves 11 and 15 are located. The sunvisor 1 thus detaches itself from the fixed points F1 and F2 of the vehicle structure and thus ceases to be rigid obstacle which has caused injury to the occupants of the vehicle.

We claim:

1. A sunvisor comprising a body; an attachment device for pivotally attaching said body to an automobile structure; a support releasably engageable by said body; and weakening means for facilitating disconnection of said body from said attachment device and from said support in an event of a collision, said weakening means including a first weakening groove provided in a region of said attachment device, and a second weakening groove provided in a region of said support.

2. A sunvisor as defined in claim 1, wherein said body has a hinge, said attachment device has a supporting pivot including a horizontal arm which is received in said hinge and a vertical arm extending from said horizontal arm, and said first weakening groove in the region of said attachment device is a transverse weakening groove which substantially reduces a cross section of said vertical arm of said supporting pivot without interfering with operation of said supporting pivot under normal conditions.

3. A sunvisor as defined in claim 2, wherein said transverse weakening groove of said vertical arm of said supporting pivot of said attachment device is located at a distance from an external surface of a base member of said supporting.

4. A sunvisor as defined in claim 2, wherein said transverse weakening groove of said vertical arm of said supporting pivot of Said attachment device extends all around a perimeter of said vertical arm.

5. A sunvisor as defined in claim 2, wherein said transverse weakening groove of said vertical arm of said supporting pivot of said attachment device extends around a perimeter of said vertical arm.

6. A sunvisor as defined in claim 1, wherein said body has a hanging bridge with a pin engageable with said support, and said second weakening groove in the region of said support is a transverse weakening groove provided in said pin and significantly reducing a cross section of said pin without interfering with operation of said pin under normal conditions.

7. A sunvisor as defined in claim 6, wherein said transverse weakening groove of said pin of said hanging bridge is located in a part of said pin which stands clear of said body of the sunvisor.

8. A sunvisor as defined in claim 6, wherein said transverse weakening groove of said pin of said hanging bridge extends all around a perimeter of said pin.

9. A sunvisor as defined in claim 6, wherein said weakening groove of said pin Of said hanging bridge extends over a perimeter of said pin.

* * * * *